United States Patent
Brown et al.

(10) Patent No.: US 12,413,172 B2
(45) Date of Patent: *Sep. 9, 2025

(54) AIRCRAFT PROPULSION SYSTEM WITH VOLTAGE REGULATOR

(71) Applicant: GENERAL ELECTRIC COMPANY, Schenectady, NY (US)

(72) Inventors: Thomas William Brown, Cincinnati, OH (US); Paul Robert Gemin, Cincinnati, OH (US); Di Pan, Schenectady, NY (US); Dominic Barone, Centerville, OH (US)

(73) Assignee: General Electric Company, Evendale, OH (US)

( * ) Notice: Subject to any disclaimer, the term of this patent is extended or adjusted under 35 U.S.C. 154(b) by 302 days.

This patent is subject to a terminal disclaimer.

(21) Appl. No.: 17/900,296

(22) Filed: Aug. 31, 2022

(65) Prior Publication Data

US 2024/0067351 A1 Feb. 29, 2024

Related U.S. Application Data

(63) Continuation of application No. 16/688,108, filed on Nov. 19, 2019, now Pat. No. 11,440,673.

(51) Int. Cl.
*H02P 29/032* (2016.01)
*B64D 27/24* (2024.01)
*B64D 31/06* (2024.01)

(52) U.S. Cl.
CPC .............. *B64D 31/06* (2013.01); *B64D 27/24* (2013.01); *H02P 29/032* (2016.02); *B64D 2221/00* (2013.01)

(58) Field of Classification Search
CPC .... B64D 31/06; B64D 2221/00; B64D 27/24; H02P 29/032
See application file for complete search history.

(56) References Cited

U.S. PATENT DOCUMENTS

| | | | |
|---|---|---|---|
| 5,773,966 | A | 6/1998 | Stewigerwald |
| 6,051,941 | A * | 4/2000 | Sudhoff .................. B60L 50/10 318/434 |
| 6,561,761 | B1 | 5/2003 | Decker et al. |
| 7,597,536 | B1 | 10/2009 | Liang |
| 7,841,828 | B2 | 11/2010 | Liang |
| 8,342,803 | B2 | 1/2013 | Grohens et al. |
| 8,378,641 | B2 | 2/2013 | Rozman et al. |
| 8,447,441 | B2 | 5/2013 | Calvignac et al. |

(Continued)

FOREIGN PATENT DOCUMENTS

| | | |
|---|---|---|
| FR | 2944166 A1 | 10/2010 |
| JP | 2014161165 A | 9/2014 |

(Continued)

*Primary Examiner* — Thai T Dinh
(74) *Attorney, Agent, or Firm* — Dority & Manning, P.A.

(57) ABSTRACT

Aspects of the disclosure generally relate to an aircraft propulsion system for an aircraft. The aircraft propulsion system can include at least an electric power source, an electric machine, and a voltage regulator. The voltage regulator regulates the electrical power provided to the electric machine from the electrical power source. The electric power source is capable of providing an AC or DC electrical output and can include a combustion engine with a generator or an electrical storage device.

20 Claims, 5 Drawing Sheets

(56) References Cited

U.S. PATENT DOCUMENTS

| | | | |
|---|---|---|---|
| 8,668,454 B2 | 3/2014 | Wiebe | |
| 8,820,677 B2 * | 9/2014 | Rajashekara | H02J 1/14 244/58 |
| 9,242,728 B2 | 1/2016 | Morrison | |
| 9,367,213 B2 | 6/2016 | Sheppard et al. | |
| 9,376,213 B2 * | 6/2016 | Rolt | B64D 27/31 |
| 10,131,441 B2 * | 11/2018 | Edwards | B64D 35/024 |
| 10,703,496 B2 * | 7/2020 | Vondrell | H02G 5/10 |
| 10,906,657 B2 * | 2/2021 | Schwarz | F02K 3/06 |
| 11,440,673 B2 * | 9/2022 | Brown | B64D 27/24 |
| 2015/0184639 A1 | 7/2015 | Goessling et al. | |
| 2016/0003060 A1 | 1/2016 | Cook | |
| 2016/0340051 A1 * | 11/2016 | Edwards | B64D 35/02 |
| 2017/0341771 A1 * | 11/2017 | Casolaro | B64C 27/54 |
| 2018/0134170 A1 | 5/2018 | Zhou et al. | |
| 2018/0186448 A1 | 7/2018 | Pantalone et al. | |
| 2018/0304753 A1 * | 10/2018 | Vondrell | B64D 27/02 |
| 2019/0052205 A1 | 2/2019 | Noderer | |
| 2019/0052206 A1 | 2/2019 | Noderer | |
| 2019/0052208 A1 | 2/2019 | Noderer | |
| 2019/0382121 A1 | 12/2019 | Schwarz et al. | |

FOREIGN PATENT DOCUMENTS

| | | |
|---|---|---|
| JP | 2018039507 A | 3/2018 |
| WO | 2014203593 A1 | 12/2014 |

* cited by examiner

FIG. 5 ic conductor
AIRCRAFT PROPULSION SYSTEM WITH VOLTAGE REGULATOR

CROSS REFERENCE TO RELATED APPLICATION(S)

This application claims priority to and benefit of U.S. patent application Ser. No. 16/688,108, filed Nov. 19, 2019, now U.S. Pat. No. 11,440,673, issued Sep. 13, 2022, which is incorporated herein in its entirety.

TECHNICAL FIELD

This disclosure generally relates to electrical aircraft propulsion systems and more specifically relates to the controlling of voltage for such systems.

BACKGROUND

Aircraft with electrical propulsion systems are not currently commonplace, although more interest is being shown. Electrical propulsion systems face unique challenges as compared to combustion propulsion systems, especially if aircraft with electrical power systems are to operate safely in the same or similar flight envelope of aircraft with combustion power systems.

One particular technical issue that must be overcome is that electrical propulsion systems include electrical conductors that must be insulated so that throughout the flight envelope the electrical conductor does not experience a partial discharge. This is especially true for aircraft having a flight envelope including higher elevations where the reduced density of the air provides less electrical insulation, which, all other things being equal, increases the possibility of a partial discharge.

DETAILED DESCRIPTION

Aspects of the present disclosure describe an aircraft propulsion system with an electric machine that rotates at least one propeller, fan, turbine, or similar device. As illustrated by way of non-limiting example, the at least one propeller can be any propulsor or propelling device. Electric power is provided to the electric machine from an electric power source via electrical conductors. A voltage regulator can regulate the voltage provided to the electrical machine from the electrical power source and therefore the voltage provided to at least a portion of the electrical conductors. Optionally, the voltage regulator can regulate the voltage provided to one or more inverters, where the one or more inverters provide voltage to the electric machine. The voltage of the supplied power can be a function of the ambient air pressure of the electrical conductors. In cases where the electrical conductor is exposed to atmospheric pressure, the ambient air pressure is a function of the altitude of the aircraft, making the voltage a function of altitude.

Connection references (e.g., attached, coupled, connected, secured, fastened, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

Figure 1:
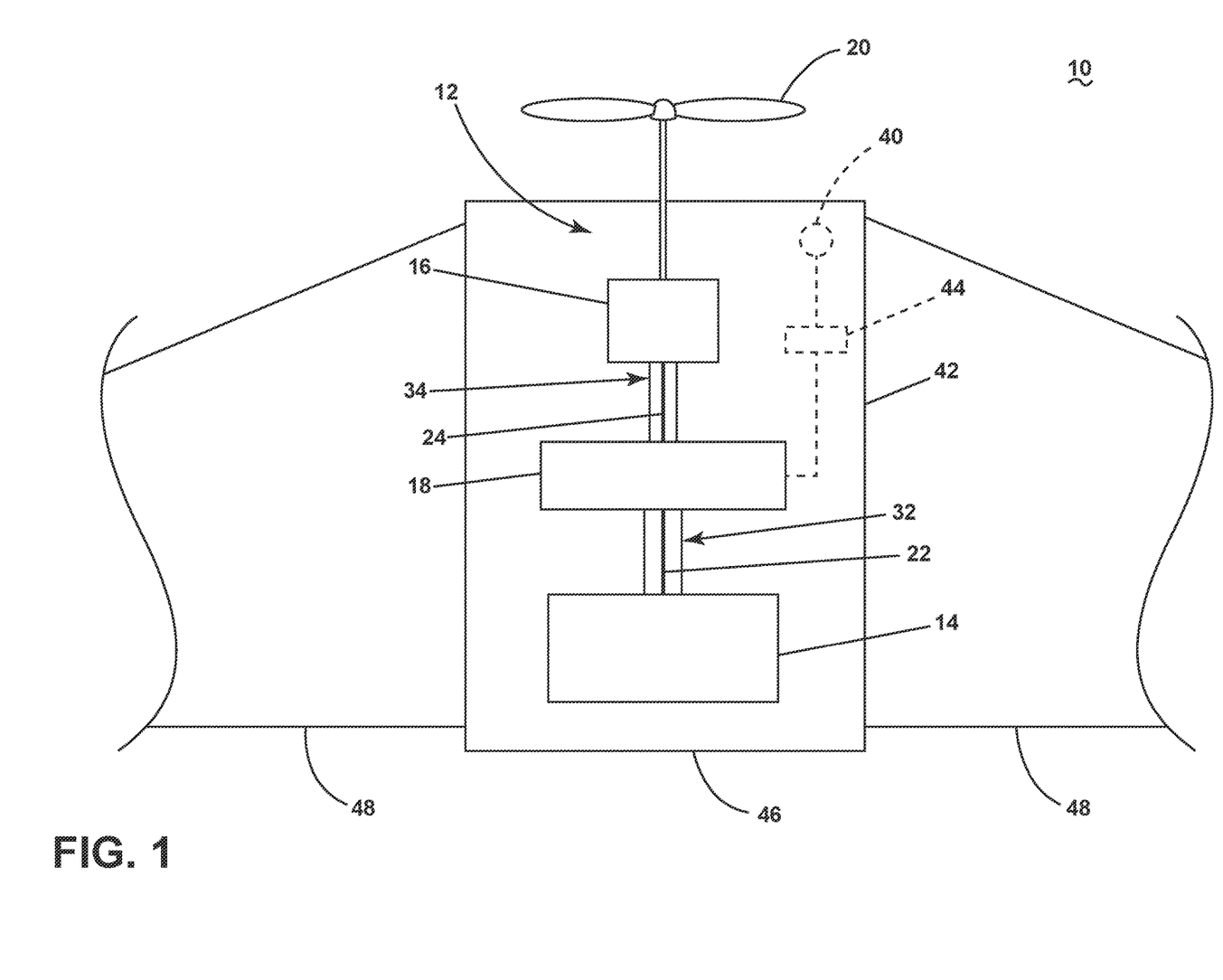
FIG. 1 is a schematic illustration of an aircraft with an aircraft propulsion system.

FIG. 1 is a schematic illustration of an aircraft 10 with an aircraft propulsion system 12. The aircraft propulsion system 12 includes at least one electric power source 14, at least one electric machine 16, at least one voltage regulator 18, and at least one propeller 20. The propeller 20 is operably rotated by the electric machine 16. The electric machine 16 is powered by the electric power source 14 via the voltage regulator 18. The voltage regulator 18 regulates the electrical power provided to the electric machine 16 from the electrical power source 14.

The electric power source 14 can be any configuration of elements that provides an electrical output, such as alternating current (AC) or direct current (DC). The electric power source 14 can be an electrical storage device. Non-limiting examples of the electrical storage machine can include one or more of a battery, a capacitor, or a thermal system. Additionally or alternatively, the electric power source 14 can be a combustion engine with a generator or rectifier. By way of non-limiting example, the combustion engine can be a turbine engine or piston engine.

The electric machine 16 can be any electromagnetic machine that can transform electrical energy to mechanical energy or mechanical energy to electrical energy. That is, the electric machine 16 includes one or more stator/rotor combinations. Non-limiting examples include an electric generator, an electric motor, or a combination electric generator/motor. The electric generator or electric motor can be an AC or DC generator or motor.

The voltage regulator 18 can include any number of electrical or mechanical components resulting in an output from the voltage regulator 18 that is a stable, predetermined, and controlled value. The output value from the voltage regulator 18 can be greater than the input voltage to the voltage regulator 18, although it is contemplated that the output value can be equal to or less than in input value. By way of non-limiting example, the voltage regulator 18 can located within or directly coupled to the electrical power source 14. Alternatively, the voltage regulator 18 can include any combination of one or more of an inverter, a converter, a rectifier, a capacitor, a resistor, a diode, an inductor, a transistor, a regulator, a switch, a transformer, or an amplifier. The voltage regulator 18 can function as a power sink or a power source, where the voltage regulator 18 can be used to control power, voltage, or current.

A first electrical conductor 22 can connect the electric power source 14 to the voltage regulator 18. A second electrical conductor 24 can connect the voltage regulator 18 to the electric machine 16. At least a portion of the first electrical conductor 22 or the second electrical conductor 24 is located in at least a portion of the aircraft 10.

The first electrical conductor 22 and the second electrical conductor 24 can include electrical insulation. The electrical insulation can be any known electrical insulation material used to reduce the likelihood of partial discharge, aging of electrical conductors, or other type of insulation failure. By way of non-liming example, a first electrical insulation 32 can surround, wrap, coat, or otherwise insulate the first electrical conductor 22. Similarly, a second electrical insulation 34 can surround, wrap, coat, or otherwise insulate the second electrical conductor 24. The first electrical insulation 32 can have a different composition or different dimensions than the second electrical insulation 34. Dimensions or size can include, but is not limited to, a gauge, a diameter, a cross-sectional area, or other measurable aspect of the insulation.

At least a portion of the first electrical conductor 22 with the first electrical insulation 32 or the second electrical conductor 24 with the second electrical insulation 34 can be exposed to the pressure of the surrounding environment, and will be referred to as ambient pressure. It is contemplated that in most cases, the ambient pressure will be the environmental pressure outside the aircraft for the current altitude, which is the atmospheric pressure. In such an instance, the ambient pressure is the same as atmospheric pressure. However, some aircraft contain pressurized regions, which are actively or passively pressurized relative to atmospheric pressure, and if the electrical conductor is located in a pressurized region, the ambient pressure will differ from the atmospheric pressure.

The first electrical insulation 32 or second electrical insulation 34 can be sized to prevent partial discharge or insulation failure of the first electrical conductor 22 and the second electrical conductor 24 at the ambient air pressure, when the electrical power source 14 is at maximum voltage.

By way of non-limiting example, the first electrical insulation 32 can be sized to prevent partial discharge or insulation failure of the first electrical conductor 22 at maximum voltage throughout the flight envelope of the aircraft propulsion system 12. Optionally, the second electrical insulation 34 is sized to not prevent partial discharge or insulation failure of the second electrical conductor 24 at maximum voltage throughout the flight envelope of the aircraft propulsion system 12.

At least one sensor 40 can be used to obtain ambient air pressure or information related to the ambient air pressure. Ambient air pressure can be pressure at any point in or around the aircraft 10. The at least one sensor 40 can be located inside the aircraft 10, as shown. It is contemplated that the at least one sensor 40 can be coupled to any portion of the aircraft 10 including an exterior 42 of the aircraft 10. It is further contemplated that the at least one sensor 40 can be multiple sensors mounted to any portion of the aircraft 10. The at least one sensor 40, by way of non-limiting example, can be one or more of a pressure sensor, an altimeter, a humidity sensor, a global positioning sensor (GPS), or a temperature sensor.

The at least one sensor 40 can be operably coupled to the voltage regulator 18. Optionally, a controller 44 can provide communication from the at least one sensor 40 to the voltage regulator 18. Many known types of controllers can be used for the controller 44. The specific type of controller is not germane to the present disclosure. The controller 44 can be included in or communicate with known flight management systems.

The aircraft propulsion system 12 is illustrated, by way of non-limiting example, as coupled to or housed within a fuselage 46 of the aircraft 10. It is contemplated that any portion of the aircraft propulsion system 12 can be coupled to or housed within other components of the aircraft 10 that can include, but are not limited to, wings 48.

While the voltage regulator is illustrated, by way of example, as a single voltage regulator 18. Any number of voltage regulators can be used in the aircraft 10 to regulate the power to the electric motor 16. It is contemplated that the voltage regulator 18 can regulate the voltage at the first conductor 22, the second conductor 24, or at both the first conductor 22 and the second conductor 24. It is further contemplated that the voltage regulator 18 can regulate the voltage of any electrical conductor within the aircraft 10.

Figure 2:
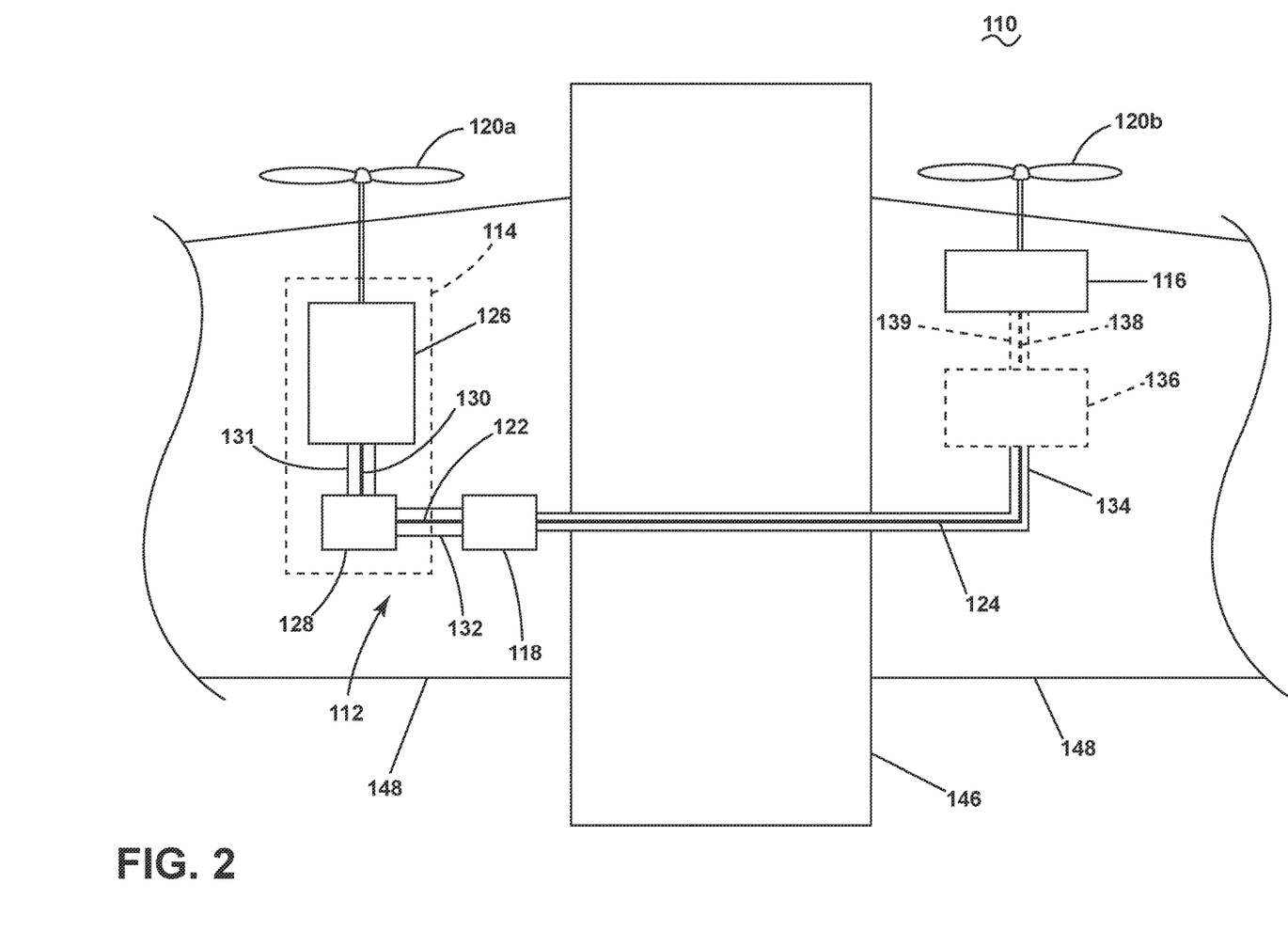
FIG. 2 is a schematic illustration of a variation of the aircraft with the aircraft propulsion system of FIG. 1.

FIG. 2 schematically illustrates an aircraft 110 with an aircraft propulsion system 112 that is substantially similar to the aircraft 10 with the aircraft propulsion system 12. Therefore, like parts will be identified with like numerals increased by 100, with it being understood that the description of the like parts of the aircraft propulsion system 12 applies to the aircraft propulsion system 112 unless otherwise noted.

The aircraft propulsion system 112 includes an electric power source 114, an electric machine 116, a voltage regulator 118, a first propeller 120a, and a second propeller 120b. The electric power source 114 includes a combustion engine 126 with a generator 128, where the combustion engine 126 and the generator 128 can be formed together or separately. Optionally electrical communicator 130 with insulation 131 can provide electrical connection between the combustion engine 126 and the generator 128. The insulation 131 can be similar to a first electrical insulation 132. The first propeller 120a is rotatably coupled to the combustion engine 126.

A first electrical conductor 122 with the first electrical insulation 132 can electrically connect the generator 128 of the electric power source 114 and the voltage regulator 118. A second electrical conductor 124 with a second electrical insulation 134 can electrically connect the voltage regulator 118 to the electric machine 116. Optionally, the second electrical conductor 124 can couple the voltage regulator 118 to an inverter 136. An electrical communicator 138 with an insulation 139 can connect the inverter 136 to the electric machine 116. The insulation 139 can be similar in size or insulating capability to the second electrical insulation 134. The second propeller 120b is operably rotated by the electric machine 116.

The electric machine 116 is powered by the electric power source 114 via the voltage regulator 118. The voltage regulator 118 regulates the electrical power or voltage provided to the electric machine 116 from the electrical power source 114.

It is contemplated that the inverter 136 can be any combination of known electronics used to alter an electrical signal and could further include additional voltage control mechanisms.

Figure 3:
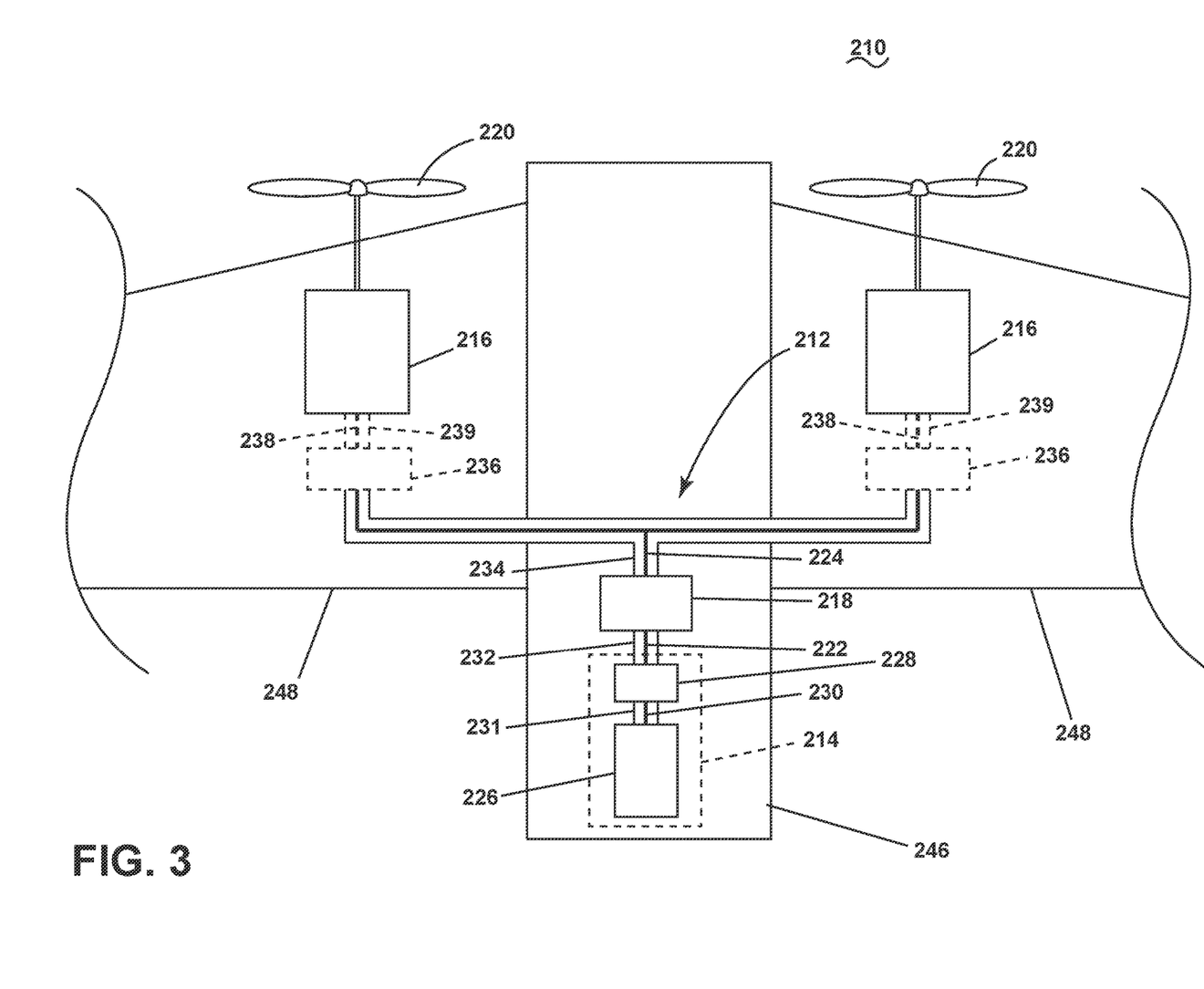
FIG. 3 is a schematic illustration of another variation of the aircraft with the aircraft propulsion system of FIG. 1.

FIG. 3 schematically illustrates an aircraft 210 with an aircraft propulsion system 212 that is substantially similar to the aircraft 10 with the aircraft propulsion system 12. Therefore, like parts will be identified with like numerals increased by 200, with it being understood that the description of the like parts of the aircraft propulsion system 12 applies to the aircraft propulsion system 212 unless otherwise noted.

The aircraft propulsion system 212 includes an electric power source 214, multiple electric machines 216, a voltage regulator 218, and multiple propellers 220. The electric power source 214 includes a combustion engine 226 with a generator 228, where the combustion engine 226 and the generator 228 can be formed together or separately. Optional electrical communicator 230 with an insulation 231 can provide electrical connection between the combustion engine 226 and the generator 228. The insulation 231 can be similar to a first electrical insulation 232.

A first electrical conductor 222 with the first electrical insulation 232 can electrically connect the generator 228 of the electric power source 214 and the voltage regulator 218. A second electrical conductor 224 with a second electrical insulation 234 can electrically connect the voltage regulator 218 to the electric machines 216. Each of the multiple electric machines 216 then rotatable operates one of the multiple propellers 220, as illustrated.

Optionally, the second electrical conductor 224 can couple the voltage regulator 218 to multiple inverters 236, where each of the multiple inverters 236 are electrically connected to one of the multiple electrical machines 216. Electrical communicators 238 with insulation 239 can connect each of the multiple inverters 236 to one of the multiple electric machines 216.

The electric machines 216 are powered by the electric power source 214 via the voltage regulator 218. The voltage regulator 218 regulates the electrical power provided to the electric machine 216 from the electrical power source 214.

It is contemplated that the voltage regulator 218 can be multiple voltage regulators, where each of the multiple voltage regulators couples to one of the multiple inverters 236 or the multiple electric machines 216.

It is further contemplated that the multiple inverters 236 can be any combination of electronics and could further include voltage control mechanisms.

Figure 4:
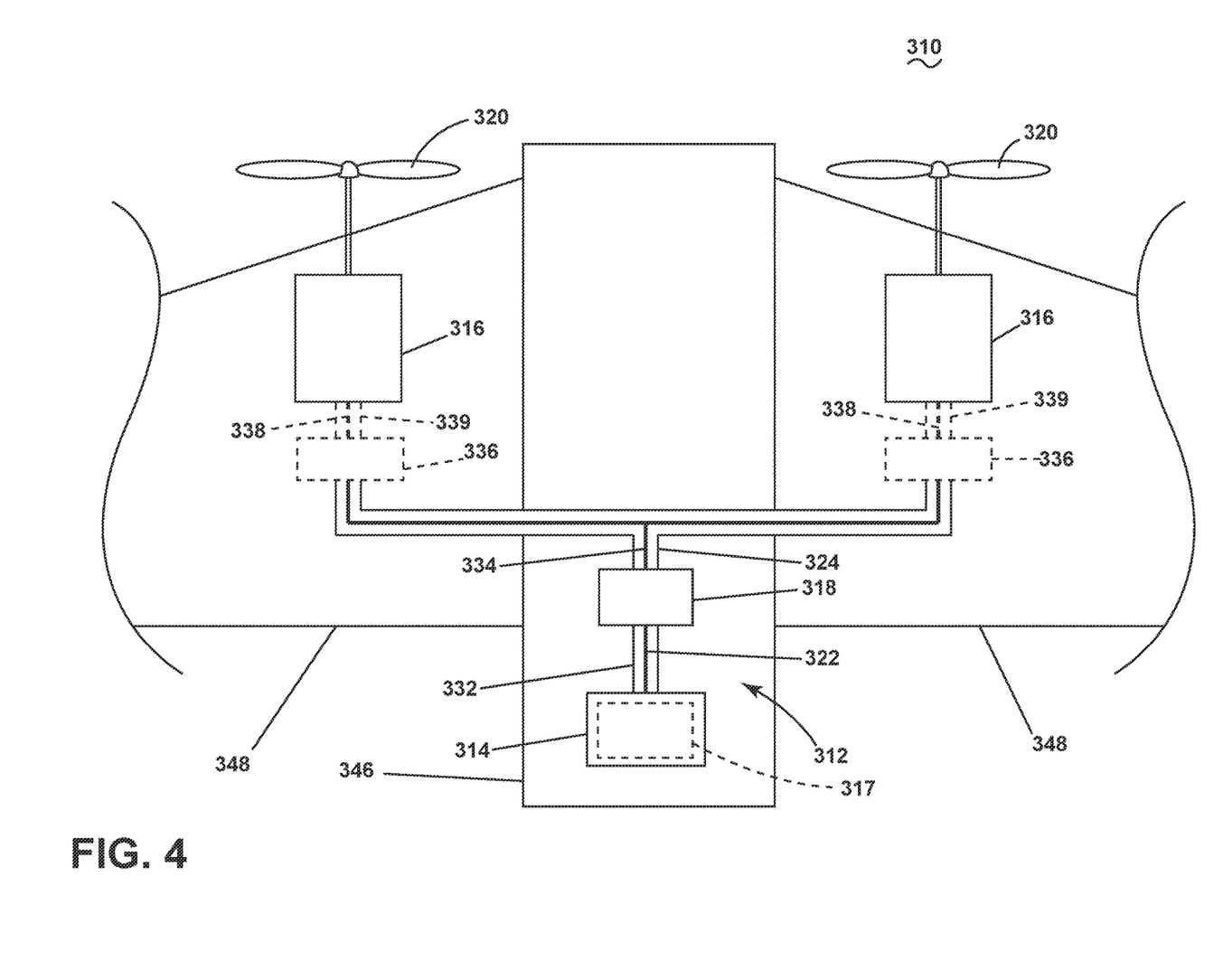
FIG. 4 is a schematic illustration of a variation of the aircraft with the aircraft propulsion system of FIG. 3.

FIG. 4 schematically illustrates an aircraft 310 with an aircraft propulsion system 312 that is substantially similar to the aircraft 210 with the aircraft propulsion system 212. Therefore, like parts will be identified with like numerals increased by 100, with it being understood that the description of the like parts of the aircraft propulsion system 212 applies to the aircraft propulsion system 312 unless otherwise noted.

The aircraft propulsion system 312 includes an electric power source 314, multiple electric machines 316, a voltage regulator 318, and multiple propellers 320. The electric power source 314 includes an electrical storage machine 317.

A first electrical conductor 322 with the first electrical insulation 332 can electrically connect the electrical storage machine 317 of the electric power source 314 and the voltage regulator 318. A second electrical conductor 324 with a second electrical insulation 334 can electrically connect the voltage regulator 318 to the electric machines 316. Each of the multiple electric machines 316 then rotatable operates one of the multiple propellers 320, as illustrated.

Optionally, the second electrical conductor 324 can couple the voltage regulator 318 to multiple inverters 336, where each of the multiple inverters 336 are electrically connected to one of the multiple electrical machines 316. Electrical communicators 338 with insulation 339 can connect each of the multiple inverters 336 to one of the multiple electric machines 316.

The electric machines 316 are powered by the electric power source 314 via the voltage regulator 318. The voltage regulator 318 regulates the electrical power provided to the electric machine 316 from the electrical power source 314.

It is contemplated that the voltage regulator 218 can be multiple voltage regulators, where each of the multiple voltage regulators couples to one of the multiple inverters 336 or the multiple electric machines 316.

It is further contemplated that the multiple inverters 336 can be any combination of electronics and could further include voltage control mechanisms.

Figure 5:
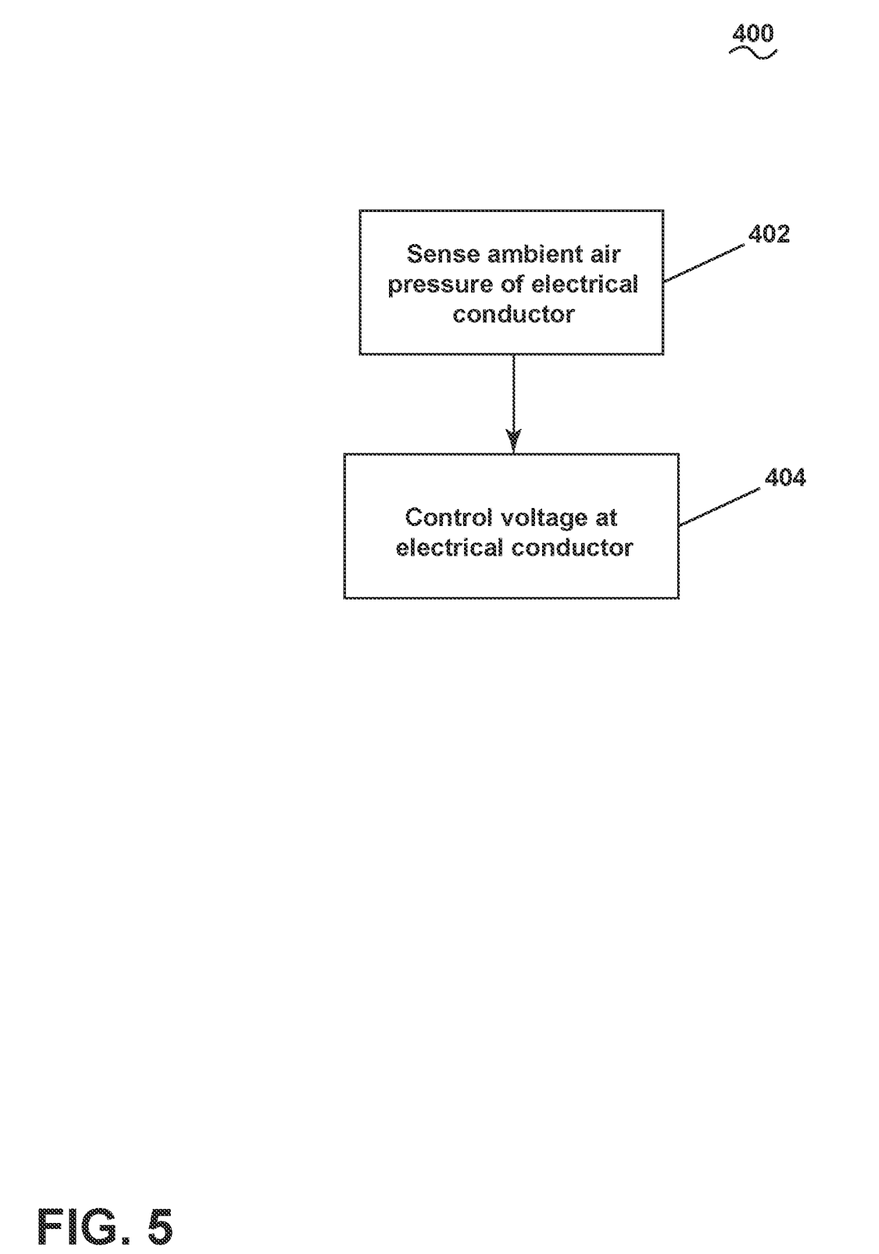
FIG. 5 is a flow chart diagram illustrating a method of operating an electric distribution system that can be carried out at least in part by the aircraft with an aircraft propulsion system of FIG. 1-FIG. 4.

FIG. 5 illustrates a method 400 for operating an electric distribution system that includes the second electrical conductor or electrical conductor 24, 124, 224, 324 where the electrical conductor 24, 124, 224, 324 supplies electricity to the electric machine 16, 116, 216, 316 that rotationally drives the propeller 20, 120b, 220, 320 in an aircraft 10, 110, 210, 310. At 202, ambient air pressure of the electrical conductor 24, 124, 224, 324 is sensed. For example, the at least one sensor 40 can be used to obtain ambient air pressure such as atmospheric pressure of the electrical conductor 24, 124, 224, 324. The sensor 40 can be located in a region of the aircraft 10, 110, 210, 310 known to have the same ambient air pressure or atmospheric pressure as the electrical conductor 24, 124, 224, 324.

At 404, the voltage at the electrical conductor 24, 124, 224, 324 is controlled based on sensed ambient air pressure. For example, the at least one sensor 40 can be used to obtain ambient air pressure of the electrical conductor 24, 124, 224, 324. The information can be communicated to the controller 44. The controller 44 then determines a threshold voltage that corresponds to the ambient air pressure. The voltage regulator 18, 118, 218, 318 receives the threshold voltage from the controller 44. The voltage at the electrical conductor 24, 124, 224, 324 is then controlled by the voltage regulator 18, 118, 218, 318 to be at or less than the threshold voltage. Controlling the voltage based on the sensed ambient air pressure can prevent partial discharge, accelerated aging, or other insulation failure of the electrical conductor 24, 124, 224, 324.

In operation, the aircraft propulsion system 12, 112, 212, 312 has a flight envelope defined by a region in which the aircraft 10, 110, 210, 310 with the aircraft propulsion system 12, 112, 212, 312 can operate safely based on a variety of factors that can include, but are not limited to, speed, altitude, air density, or angle of attack. The aircraft 10, 110, 210, 310 with the aircraft propulsion system 12, 112, 212, 312 includes the first electrical conductor 22, 122, 222, 322 with the first electrical insulation 32, 132, 232, 332 sized to prevent partial discharge or other insulation failure of the first electrical conductor 22, 122, 222, 322 at maximum voltage throughout the flight envelope of the aircraft propulsion system 12, 112, 212, 312. The first electrical conductor 22, 122, 222, 322 electrically connects the electrical power source 14, 114, 214, 314 to the voltage regulator 18, 118, 218, 318.

During the flight envelope, the decrease in ambient air pressure indicates that there is less atmosphere to provide insulation to the first electrical conductor 22, 122, 222, 322. The first electrical insulator 32, 132, 232, 332 on the first electrical conductor 22, 122, 222, 322 must be thick enough to reduce the possibility of partial discharge, accelerated aging, or other insulation failure from the first electrical conductor 22, 122, 222, 322 at the highest altitude of the flight envelope when provided with maximum voltage.

However, the aircraft 10 doesn't typically have the same power demands at higher altitudes as it does during take-off, for example. The reduced power demand at higher altitudes allows the aircraft propulsion system 12, 112, 212, 312 to utilize the voltage regulator 18, 118, 218, 318 to provide a reduced voltage or power to the electric machine 16, 116, 216, 316. The second electrical conductor 24, 124, 224, 324 electrically connects the voltage regulator 18, 118, 218, 318 and the electric machine 16, 116, 216, 316. Because the voltage regulator 18, 118, 218, 318 can control the voltage at the second electrical conductor 24, 124, 224, 324 to be less than or equal to at maximum voltage based on ambient air pressure, the second electrical insulation 34, 134, 234, 334 can be sized smaller than the first electrical conductor 22, 122, 222, 322. Appropriate threshold voltage at the second electrical conductor 24, 124, 224, 324 can be determined using the at least one sensor 40 in communication with the controller 44, resulting in the electric power or voltage being a function of the ambient air pressure. The threshold voltage at the second electrical conductor 24, 124, 224, 324 is determined based on the ambient air pressure of the second electrical conductor 24, 124, 224, 324 obtained by the at least one sensor. The threshold voltage prevents partial discharge of the second electrical conductor 24, 124, 224, 324. Since, the electric machine 16, 116, 216, 316 requires less power at higher altitudes, especially when cruising, the operation of the aircraft 10, 110, 210, 310 is not impaired by the decrease in voltage at the second electrical conductor 24, 124, 224, 324.

Alternatively, the voltage regulator 18, 118, 218, 318 can provide constant power to the electric machine 16, 116, 216, 316 while adjusting the voltage to the threshold voltage as determined by the altitude. This is accomplished by allowing the current to vary accordingly to provide the constant power at varying threshold voltages.

Technical effects of the system and method disclosed herein provides a control system that can vary the voltage of the supplied power as a function of the ambient air pressure of the electrical conductors. The ambient air pressure can, at least in part, be a function of altitude, making the voltage also a function of the altitude. By controlling the voltage at least some of the electrical conductors to require less electrical insulation to reduce the possibility of partial discharge from the electrical conductors.

Additionally, controlling the voltage based on altitude can reduce the aging of the conductors. The manipulation of the voltage based on the threshold voltage determined by altitude can result in a lower cumulative current flowing through the conductors during a flight, therefore the conductors experience lower thermal impact. Similarly, the insulation experiences less wear with the decrease in heat due to current. A lower cumulative current flowing through the conductors can also result in a lower cumulative heat dissipation per flight.

Aspects of the present disclosure provide for a variety of benefits. For example, by decreasing the size of the second electrical insulation, the weight of the aircraft will also decrease. A decrease in aircraft weight contributes to better fuel efficiency.

Another advantage of the present disclosure is a cost savings due to the decreasing the size or amount of the second electrical insulation placed on the second electrical conductor.

Many other possible configurations in addition to those shown in the above figures are contemplated by the present disclosure. For example, more than one aircraft propulsion system can be used on a single aircraft, where the multiple aircraft propulsion systems can include similar or different components. To the extent not already described, the different features and structures of the various aspects can be used in combination with others as desired. That one feature cannot be illustrated in all of the aspects is not meant to be construed that it cannot be, but is done for brevity of description. Thus, the various features of the different aspects can be mixed and matched as desired to form new aspects, whether or not the new aspects are expressly described. Combinations or permutations of features described herein are covered by this disclosure.

This written description uses examples to disclose aspects of the invention, including the best mode, and also to enable any person skilled in the art to practice aspects of the invention, including making and using any machines, devices, or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects of the invention are provided by the subject matter of the following clauses:

1. An aircraft propulsion system for an aircraft, including a propeller, an electric machine operably rotating the propeller, an electrical power source providing electrical power to the electric machine, and a voltage regulator regulating the electrical power provided to the electric machine from the electrical power source and configured to control the voltage of the electric power provided as a function of ambient air pressure in at least one portion of the aircraft.
2. The aircraft propulsion system of any preceding clause further including an electrical conductor connecting the voltage regulator to the electric machine and the at least one portion of the aircraft includes at least a portion of the electrical conductor.
3. The aircraft propulsion system of any preceding clause wherein the electrical conductor comprises an electrical insulation.
4. The aircraft propulsion system of any preceding clause wherein the electrical insulation is sized to prevent partial discharge at maximum voltage of the electrical power source at the ambient air pressure.
5. The aircraft propulsion system of any preceding clause wherein the electrical insulation is not sized to prevent partial discharge throughout the flight envelope of the aircraft propulsion system.
6. The aircraft propulsion system of any preceding clause wherein the voltage regulator is configured to control the voltage of the provided electric power to prevent partial discharge throughout the flight envelope.
7. The aircraft propulsion system of any preceding clause further comprising an ambient air pressure sensor operably coupled to the voltage regulator.
8. The aircraft propulsion system of any preceding clause wherein the ambient air pressure sensor is an altimeter.
9. The aircraft propulsion system of any preceding clause wherein an electrical conductor is exposed to atmospheric pressure and the ambient air pressure is the current atmospheric pressure.
10. The aircraft propulsion system of any preceding clause wherein the electric power source is one of an AC or DC electric power source.
11. The aircraft propulsion system of any preceding clause wherein the electric machine is at least one of an AC or DC motor.
12. The aircraft propulsion system of any preceding clause wherein the propeller comprises multiple propellers.
13. The aircraft propulsion system of any preceding clause wherein the electric machine comprises multiple electric machines, where each of the multiple propellers being rotatably driven by a different one of the multiple electric machines.

14. The aircraft propulsion system of any preceding clause where the voltage regulator is electrically coupled to all of the multiple electric machines.

15. The aircraft propulsion system of any preceding clause wherein the voltage regulator comprises multiple voltage regulators, with each of the multiple electric machines being electrically coupled to a different one of the multiple voltage regulators.

16. The aircraft propulsion system of any preceding clause wherein the electric power source comprises at least one of a combustion engine with generator or an electrical storage device.

17. The aircraft propulsion system of any preceding clause wherein the voltage regulator comprises an inverter or a converter.

18. A method of operating a electric distribution system having an electrical conductor supplying electricity to an electric machine rotationally driving a propeller in an aircraft, the method comprising sensing ambient air pressure of the electrical conductor and controlling the voltage at the electrical conductor based on the sensed ambient air pressure.

19. The method of any preceding clause wherein the controlling the voltage comprises controlling the voltage to prevent partial discharge from the electrical conductor based on the sensed ambient air pressure.

20. The method of any preceding clause wherein the sensed ambient air pressure is atmospheric pressure.

The invention claimed is:

1. An electric distribution system, comprising:
an electrical power source having a power output; and
a regulator configured to regulate the electrical power at the power output by controlling at least one of a voltage, a current, or a power provided to the electric distribution system based on an ambient air pressure.

2. The electric distribution system of claim 1, wherein the electric distribution system operably rotates an electric machine for a propeller.

3. The electric distribution system of claim 1, wherein the electric distribution system is an aircraft electric distribution system.

4. The electric distribution system of claim 3, wherein the ambient air pressure is sensed by an aircraft ambient air pressure sensor.

5. The electric distribution system of claim 1, further comprising electrical insulation insulating a conductor coupled at the power output, and wherein the electrical insulation is sized to prevent partial discharge at maximum voltage of the electrical power source at the ambient air pressure.

6. The electric distribution system of claim 5, wherein the voltage regulator is configured to regulate the power at the power output by controlling the voltage provided at the power output to prevent partial discharge.

7. The electric distribution system of claim 1, further comprising an electrical conductor connected at the power output, and wherein the electrical conductor is exposed to the ambient air pressure.

8. A method of operating an electric distribution system in an aircraft, the method comprising:
sensing ambient air pressure; and
controlling at least one of a voltage, a current, or a power of the electric distribution system based on the sensed ambient air pressure.

9. The method of claim 8 wherein sensing ambient air pressure includes sensing ambient air pressure at the electric distribution system.

10. The method of claim 8 wherein controlling the voltage includes controlling the voltage of a voltage regulator at a power output of an electrical power source of the electric distribution system.

11. The method of claim 8 wherein sensing ambient air pressure includes sensing an ambient air pressure of the aircraft.

12. The method of claim 8 wherein controlling the voltage includes controlling the voltage at a conductor of the electric distribution system, wherein the conductor is insulated by an insulator.

13. The method of claim 12 wherein controlling the voltage at the conductor further includes controlling the voltage to prevent partial discharge based on the sensed ambient air pressure.

14. The method of claim 8 wherein sensing ambient air pressure includes sensing atmospheric pressure.

15. A method of operating an electric distribution system in an aircraft, the method comprising:
controlling at least one of a voltage, a current, or a power by a regulator, as a function of ambient air pressure in at least one portion of the aircraft; and
providing, by the electric distribution system, the controlled at least one of the voltage, the current, or the power to an electric machine configured to operably rotate a propeller of the aircraft.

16. The method of claim 15, further comprising sensing ambient air pressure in the at least one portion of the aircraft.

17. The method of claim 16 wherein sensing ambient air pressure includes sensing atmospheric pressure.

18. The method of claim 15 wherein controlling the voltage includes controlling the voltage at a conductor of the electric distribution system, wherein the conductor is insulated by an insulator.

19. The method of claim 18 wherein controlling the voltage at the conductor further includes controlling the voltage to prevent partial discharge based on the ambient air pressure.

20. The method of claim 15 wherein controlling the voltage includes controlling the voltage at a power output of an electrical power source of the electric distribution system.

* * * * *